(12) United States Patent
Alberi-Morel et al.

(10) Patent No.: US 9,294,713 B2
(45) Date of Patent: Mar. 22, 2016

(54) METHOD FOR TRANSMITTING VIDEO CONTENTS FROM A SERVER TO A TERMINAL OF A USER WITHIN SERVICE PERIODS OF A RADIO TRANSPORT CHANNEL

(75) Inventors: Marie Line Alberi-Morel, Nozay (FR); Sylvaine Kerboeuf, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/580,514

(22) PCT Filed: Jan. 21, 2011

(86) PCT No.: PCT/EP2011/050836
§ 371 (c)(1),
(2), (4) Date: Dec. 6, 2012

(87) PCT Pub. No.: WO2011/101201
PCT Pub. Date: Aug. 25, 2011

(65) Prior Publication Data
US 2013/0077605 A1    Mar. 28, 2013

(30) Foreign Application Priority Data
Feb. 22, 2010    (EP) .................................... 10290089

(51) Int. Cl.
*H04N 7/24*    (2011.01)
*H04N 7/08*    (2006.01)
(Continued)

(52) U.S. Cl.
CPC ................ *H04N 7/08* (2013.01); *H04H 20/33* (2013.01); *H04H 20/426* (2013.01); *H04W 72/04* (2013.01)

(58) Field of Classification Search
CPC ........ H04N 7/08; H04W 72/04; H04H 20/33; H04H 20/426
USPC ......................................................... 370/336
See application file for complete search history.

(56) References Cited

U.S. PATENT DOCUMENTS 5,418,571 A * 5/1995 Ghanbari ................. 375/240.16
7,630,451 B2 * 12/2009 Collins et al. ................. 375/261
(Continued)

FOREIGN PATENT DOCUMENTS

| CN | 101262604 A | 9/2008 |
|---|---|---|
| CN | 101335594 A | 12/2008 |
| WO | WO 2006/053949 A1 | 5/2006 |

OTHER PUBLICATIONS

Thomas Schierl et al., "Using H.264/AVC-based Scalable Video Coding (SVC) for Real Time Streaming in Wireless IP Networks," Circuits and Systems, IEEE International Symposium, pp. 3455-3458, XP031182049, May 1, 2007.
(Continued)

*Primary Examiner* — Jay P Patel
(74) *Attorney, Agent, or Firm* — Fay Sharpe LLP

(57) ABSTRACT

The invention related to a method for transmitting video contents from a server to a terminal of a user within service periods (S) of a radio transport channel, each video content being encoded by using scalable codec technology for integrating a scalable codec base layer ($b_1$, $b_2$, $b_3$, $b_4$) and at least one enhancement layer ($e_1$, $e_2$, $e_3$, $e_4$), each service period (S) comprising: —at least one multiplexed time-sliced radio burst (A, A') comprising at least a part of the base layers ($b_1$, $b_2$, $b_3$, $b_4$); —several multiplexed time-sliced radio bursts (B, C, D, E) comprising the enhancement layers ($e_1$, $e_2$, $e_3$, $e_4$) and the eventual remaining base layers ($b_1$, $b_2$, $b_3$, $b_4$); said method enabling to permute, between two consecutive service periods (S), the transmission order of the enhancement layers bursts (B, C, D, E).

10 Claims, 1 Drawing Sheet

(51) Int. Cl.
*H04H 20/33* (2008.01)
*H04H 20/42* (2008.01)
*H04W 72/04* (2009.01)

(56) References Cited

U.S. PATENT DOCUMENTS

| | | | |
|---|---|---|---|
| 7,660,368 B2 * | 2/2010 | Ling et al. | 375/332 |
| 8,161,352 B2 | 4/2012 | Sayadi et al. | |
| 8,194,796 B2 * | 6/2012 | Collins et al. | 375/340 |
| 8,223,853 B2 * | 7/2012 | Vijayan et al. | 375/260 |
| 8,520,702 B2 * | 8/2013 | Chen et al. | 370/469 |
| 2003/0076858 A1 * | 4/2003 | Deshpande | 370/468 |
| 2006/0171283 A1 * | 8/2006 | Vijayan et al. | 369/94 |
| 2006/0178755 A1 * | 8/2006 | Ling et al. | 700/1 |
| 2006/0183287 A1 * | 8/2006 | Collins et al. | 438/278 |
| 2008/0304520 A1 * | 12/2008 | Hannuksela et al. | 370/498 |
| 2009/0006927 A1 * | 1/2009 | Sayadi et al. | 714/762 |
| 2009/0180549 A1 * | 7/2009 | Hosein et al. | 375/240.25 |
| 2010/0083334 A1 * | 4/2010 | Alberi-Morel | 725/126 |

OTHER PUBLICATIONS

Mehdi Rezaei, "Optimal Channel Changing Delay for Mobile TV over DVB-H," IEEE Int. Con. on Portable Information Devices, pp. 1-5, Mar. 2007.

International Search Report for PCT/EP2011/050836 dated Feb. 25, 2011.

* cited by examiner

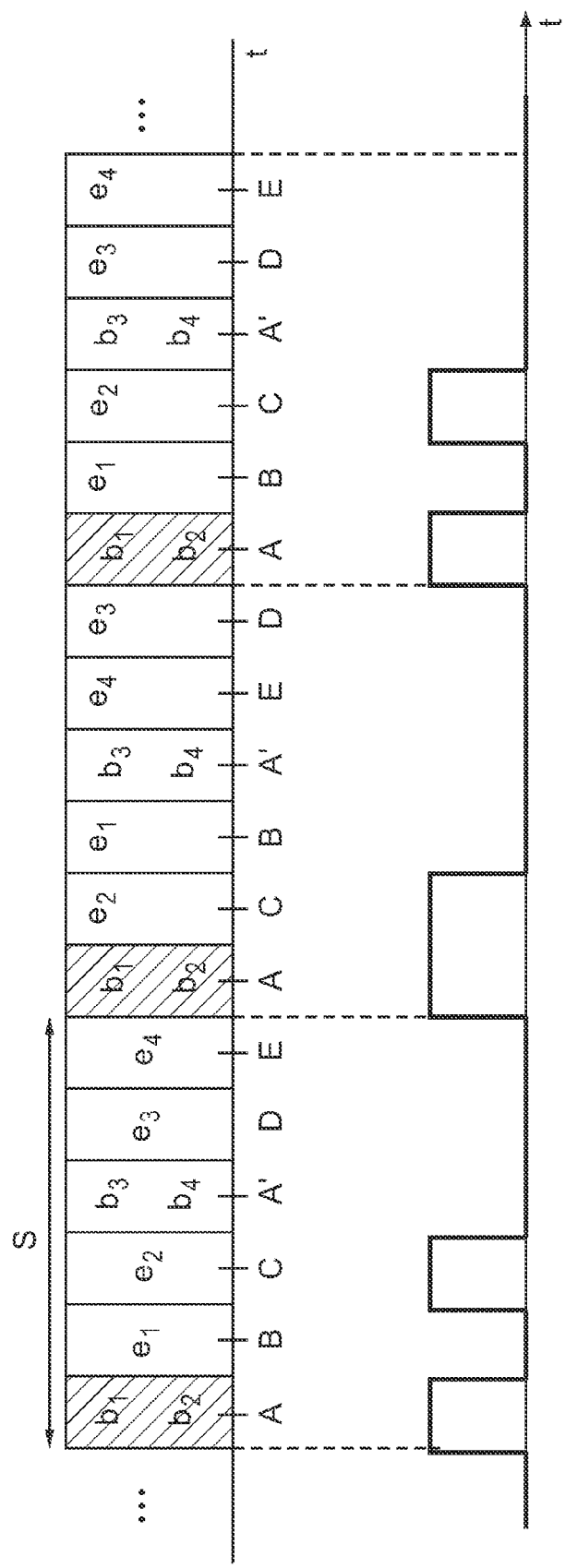

METHOD FOR TRANSMITTING VIDEO CONTENTS FROM A SERVER TO A TERMINAL OF A USER WITHIN SERVICE PERIODS OF A RADIO TRANSPORT CHANNEL

The invention relates to a method for transmitting video contents from a server to a terminal of a user within service periods of a radio transport channel, to a server for transmitting video contents to a terminal of a user within service periods of a radio transport channel and to a terminal for receiving video contents from such a server.

Broadcast operators and wireless network operators providing television (TV) services, as for example live and/or near live TV services, redouble of efforts to provide for their customers video contents with the best possible Quality of Experience (QoE), i.e. with minimal channel change delays and minimal error in video frames, since excessive delay between the switching request and the start of the media rendering for newly-joined channel obviously leads to a drop in users' satisfaction.

Besides, above mentioned operators have to take into account the users accessing to their TV services with handheld terminals, such as personal digital assistants (PDA) or smartphones, for which it is crucial to save the power consumption in order to maintain the battery life of their terminals as long as possible.

Amongst the solutions that have been already proposed to reduce the channel change delay, some of them consist in grouping several video contents in same radio transport channels.

The article "Optimal Channel Changing Delay for Mobile TV over DVB-H" (M. Rezaei, I. Bouazizi, V. K. M. Vadakital, M. Gabbouj) describes a solution which enables to tune three parameters, i.e. the value of the receiving delay (also called off-time duration), the buffering delay and the decoder refresh delay, in order to achieve better quality for compressed video with minimum channel change delay and minimum power consumption in a DVB-H receiver (Digital Video Broadcasting-Handheld) of an handheld terminal.

More precisely, this solution consists in selecting the optimal values for each of the three above mentioned parameters, particularly by impacting on the values of the buffering delay and of the decoder refresh delay, in order to maximize the off-time duration while minimizing the channel change delay.

However, in the case of a Time Division Multiplexing (TDM) transport scheme of layered video contents, for example video contents which are encoded with the H264 SVC (Scalable Video Coding) standard, this solution is not sufficient to optimize the power saving of a receiver of a handheld terminal.

The invention aims to improve the prior art by proposing a simple method for transmitting layered video contents from a server to a terminal of a user, in particular by means of a TDM transport scheme, while optimizing the power saving of said terminal without impacting negatively on channel change delays.

For that purpose, and according to a first aspect, the invention relates to a method for transmitting video contents from a server to a terminal of a user within service periods of a radio transport channel, each video content being encoded by using scalable codec technology for integrating a scalable codec base layer and at least one enhancement layer, each service period comprising:
  at least one multiplexed time-sliced radio burst comprising at least a part of the base layers;
  several multiplexed time-sliced radio bursts comprising the enhancement layers and the eventual remaining base layers;
said method enabling to permute, between two consecutive service periods, the transmission order of the enhancement layers bursts.

According to a second aspect, the invention relates to a server for transmitting video contents to a terminal of a user within service periods of a radio transport channel, said server comprising means to encode each video content by using scalable codec technology for integrating a scalable codec base layer and at least one enhancement layer, said server also comprising means to multiplex in each service period:
  at least one time-sliced radio burst comprising at least a part of the base layers;
  several time-sliced radio bursts comprising the enhancement layers and the eventual remaining base layers;
said server further comprising means to permute, between two consecutive service periods, the transmission order of the enhancement layers bursts.

According to a third aspect, the invention relates to a terminal for receiving video contents from such a server, said terminal comprising a receiver integrating a buffer enabling to decode firstly the multiplexed scalable codec base layer of the video content requested by the user of said terminal and then to decode the multiplexed enhancement layers for said video content.

Other aspects and advantages of the invention will become apparent in the following description made with reference to the appended FIGURE that represents temporally in parallel:
  the transmission, within service periods of a radio transport channel, of video contents from a server to a terminal according to a method of the invention (on the top graph);
  the behaviour of the receiver of said terminal during said services periods (on the bottom graph).

The invention here described concerns video contents which are broadcasted and encoded by using scalable codec technology for integrating a scalable codec base layer b and at least one enhancement layer e.

Indeed, scalable codecs encode each video content according to a layered system consisting of multiple layers of different visual importance: a base layer b and at least one enhancement layer e.

The base layers b provide a correct video quality for their corresponding video contents, i.e. video basic quality and/or video basic temporal and spatial resolution (video minimal quality), the enhancement layers e further increasing the video quality and/or the spatial and temporal resolution of said video contents.

In particular, each video content is encoded by using scalable codec technology for integrating a scalable codec base layer b and at least one enhancement layer e. To do so, the server comprises means to encode each video content in this way.

According to an embodiment, the video contents are encoded by using a scalable video coding, as for example the H264 SVC (Scalable Video Coding) standard.

The encoded video contents are transmitted from the server to a terminal of a user within service periods S of a radio transport channel. According to an embodiment, the encoded video contents are transmitted by using a Time Division Multiplexing (TDM) transport scheme.

Generally, notably when using a TDM transport scheme, the length of the service periods S is constant. In particular, the length of the service periods S can be comprised between one second and a dozen of seconds. According to an embodiment, the length of the service periods S can also be variable.

To be transmitted to a terminal of a user, the encoded video contents are multiplexed. In particular, the invention can be implemented in an existing broadcast/multicast and unicast service platform, such as a third Generation (3G) or fourth Generation (4G) wireless network or a Digital Video Broadcasting/Satellite Handheld (DVB-SH) network, to provide mobile television, for example live or near live mobile television, in an efficient way.

In particular, the method of the invention would enable network operators to provide service differentiation to servers implementing Scalable Video Coding (SVC) encoders in keeping the advantage of time-slicing for handheld terminals, i.e. power saving, while reducing the negative impact of Time Division Multiplexing (TDM) scheme on the channel change delay.

For example, the invention can be implemented in the platform proposed by Alcatel-Lucent® for Digital Video Broadcasting/Satellite Handheld (DVB-SH) technology. In that case, the invention would be implemented in the Internet Protocol Encapsulator (IPE) located inside the Mobile interactive TeleVision (MiTV) service platform of the Alcatel-Lucent® AGMTS solution.

The invention can also be implemented in the Radio Network Controller (RNC) or in the Media CEnter (MCE)—eNodeB products of Alcatel-Lucent® implementing evolved Multimedia Broadcast Multicast Service (eMBMS).

The invention is also fully compliant with the Time Division Multiple Access (TDMA) mode or with the Orthogonal Frequency Division Multiple Access (OFDMA) mode.

For transmitting the encoded video contents to a terminal of a user, the server comprises means to multiplex in each service period S:
- at least one time-sliced radio burst comprising at least a part of the base layers b (hereafter called "base layers burst");
- several time-sliced radio bursts comprising the enhancement layers e and the eventual remaining base layers b (hereafter called "enhancement layers bursts").

For receiving video contents from the server, the terminal of a user comprises a receiver integrating a buffer enabling to decode firstly the multiplexed scalable codec base layer b of the video content requested by the user of said terminal and then to decode the multiplexed enhancement layers e for said video content.

In particular, the terminal can be a handheld terminal, such as a personal digital assistant (PDA) or a smartphone.

According to a first embodiment, all the base layers b of the video contents are inserted in a same base layer burst, the enhancement layers e being inserted in enhancement layers bursts to be sent separately, all of said bursts being sent to the terminal within services periods S of a radio transport channel.

During a service period S, the base layer burst is sent first to the terminal, the receiver of which decoding with its buffer the base layer b corresponding to the video content requested by the user of said terminal. Then, the enhancement layers e corresponding to each of the base layers b inserted in the base layer burst are sent successively to the terminal, the receiver of which waking up again when it receives the successive enhancement layers bursts comprising the enhancement layers e corresponding to the previously decoded base layer b.

According to an embodiment, each video content is encoded for integrating a base layer b and one enhancement layer e.

When the base layer b and the enhancement layer e of the requested video content are not inserted in contiguous radio bursts, the receiver of the terminal has to wake up twice in a same service period S to recover both of the layers b, e of said video content, which has a negative impact on the power consumption saving benefit. Indeed, the receiver needs time to wake up, because its oscillator needs time to begin oscillating, and a bit more time to stabilize at the desired frequency, whereas most of the amplifiers in said receiver can wake up and stabilize in a short time.

To overcome this problem, the method of the invention enables to permute, between two consecutive service periods S, the transmission order of the enhancement layers bursts. To do so, the server comprises means to permute the transmission order of the enhancement layers bursts in this way. Preferably, the transmission order of the enhancement layers bursts is permuted in a circular way.

Moreover, to avoid additive signalling to signal the position order of a video content, the method of the invention can provide for using a deterministic permutation law known by the receiver of the terminal.

The method periodically permits the receiver of the terminal to wake up only once during a service period S to recover the requested layers b, e. For instance, when there are P video contents to be transmitted to the terminal (P being a positive integer), each of said video content being encoded for integrating a base layer b and one enhancement layer e, the receiver of the terminal wakes up only once every P service period S.

A transport scheme as the above described one, with all the P base layers b of the P video contents inserted in a same base layer burst, permits to minimize the channel change delay, but in return it decreases the off-time duration of the receiver of the terminal, which increases the power consumption of said terminal. Nevertheless, the method of the invention enables to reduce a little the power consumption of the terminal.

According to a preferred embodiment, each service period S comprises several base layers bursts, at least two enhancement layers bursts being inserted between two consecutive base layers bursts, wherein the transmission order of said inserted enhancement layers bursts is permuted between two consecutive service periods S.

In this embodiment, M base layers b (M being a positive integer such as M≤P) are inserted in a same base layer burst, the remaining P-M base layers b being inserted in other base layers bursts. The optimal transport scheme, which provides minimal channel change delay and maximal off-time duration, enables to smartly distribute the P base layers b in L base layers bursts per service period S, each of the L base layers bursts comprising M base layers b, L being the superior integer part of P/M.

In this embodiment, the channel change delay is increased between two video contents whose respective base layers b are inserted in two different base layers bursts, but in compensation the off-time duration of the receiver of the terminal is increased, which enables power saving in said terminal.

Preferably, the inserted enhancement layers bursts comprise the enhancement layers e corresponding to the base layers b of the preceding base layer burst. Thus, not only the transmission order of the enhancement layers bursts is permuted between two consecutive service periods S, but also between two consecutive base layers bursts in a same service period S, which permits more frequently, i.e. every M period, the receiver to wake up only once to recover the requested layers b, e.

The FIGURE represents an example of this latter embodiment, corresponding to the case with P=4 and M=2.

More precisely, the server transmits four video contents to the terminal of a user, the respective base layers $b_1$, $b_2$ and $b_3$, $b_4$ of said video contents being inserted respectively in two base layers bursts A, A', and their respective enhancement layers $e_1$, $e_2$, $e_3$, $e_4$ being inserted respectively in four enhancement layers bursts B, C, D, E.

In relation with the top graph of the FIGURE, the enhancement layers bursts B, C are inserted between the base layers bursts A, A' of the first service period S and comprise the enhancement layers $e_1$, $e_2$ corresponding respectively to the base layers $b_1$, $b_2$ of the preceding base layer burst A.

Besides, the enhancement layers bursts D, E are inserted between the base layer burst A' of the first service period S and the base layer burst A of the following service period, said enhancement layers bursts comprising the enhancement layers $e_3$, $e_4$ corresponding respectively to the base layers $b_3$, $b_4$ of the preceding base layer burst A'.

The bottom graph of the FIGURE represents the behaviour of the receiver of the terminal during services periods. According to this graph, the user of the terminal watches the video content corresponding to the layers $b_2$, $e_2$.

In the first service period S, the base layer $b_2$ and the enhancement layer $e_2$ of the video content 2 are inserted in two non contiguous radio bursts A, C. Thus, the receiver of the terminal has to wake up twice to recover both of the layers $b_2$, $e_2$ and to decode them with its buffer.

In the second service period, the server has permuted the transmission order of the enhancement layers bursts B, C, so that the enhancement layers burst C comprising the enhancement layer $e_2$ is contiguous to the base layer burst A. Thus, in this period, the receiver of the terminal has to wake up only once to recover both of the layers $b_2$, $e_2$ and to decode them with its buffer.

In the third service period, the server has permuted the transmission order of the enhancement layers bursts B, C again, so that the base layer $b_2$ and the enhancement layer $e_2$ are not inserted in contiguous radio bursts A, C anymore. Thus, the receiver has to wake up twice to recover both of the layers $b_2$, $e_2$ and to decode them with its buffer.

With this smart repartition of the base layers $b_1$, $b_2$, $b_3$, $b_4$ in two base layers bursts A, A' and this smart repartition of the enhancement layers bursts B, C, D, E within service periods S, the receiver can achieve the reception of the requested layers $b_2$, $e_2$ during contiguous radio bursts every two service periods S.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to assist the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for transmitting video contents from a server to a terminal of a user within service periods of a radio transport channel, each video content being encoded by using scalable codec technology for integrating a scalable codec base layer and at least one enhancement layer, each service period comprising:
   at least one multiplexed time-sliced radio burst comprising at least a part of the base layers;
   several multiplexed time-sliced radio bursts comprising the enhancement layers and the eventual remaining base layers;
wherein the method comprises permuting, between two consecutive service periods, the transmission order of the enhancement layers bursts.

2. The method for transmitting according to claim 1, wherein each service period comprises several base layers bursts, at least two enhancement layers bursts being inserted between two consecutive base layers bursts, wherein the transmission order of the inserted enhancement layers bursts is permuted between two consecutive service periods.

3. The method for transmitting according to claim 2, wherein the inserted enhancement layers bursts comprise the enhancement layers corresponding to the base layers of the preceding base layers burst.

4. The method for transmitting according to claim 1, wherein the length of the service periods is variable.

5. The method for transmitting according to claim 1, wherein the video contents are encoded by using the H264 SVC standard.

6. The method for transmitting according to claim 1, wherein the encoded video contents are transmitted by using a Time Division Multiplexing transport scheme.

7. The method for transmitting according to claim 1, wherein the transmission order of the enhancement layers bursts is permuted in a circular way.

8. The method for transmitting according to claim 1, wherein the base layers provide a correct video quality for their corresponding video contents, the enhancement layers increasing the video quality and the spatial and temporal resolution of the video contents.

9. A server for transmitting video contents to a terminal of a user within service periods of a radio transport channel, the server comprising:
   an SVC (Scalable Video Coding) encoder configured to encode each video content by using scalable codec technology for integrating a scalable codec base layer and at least one enhancement layer,
   wherein the server is configured to transmit the encoded video content using a time division multiplexing scheme, where in each service period at least one time-sliced radio burst comprising at least a part of the base layers is multiplexed, several time-sliced radio bursts comprising the enhancement layers, and the eventual remaining base layers, wherein the server is configured to permute, between two consecutive service periods, the transmission order of the enhancement layers bursts.

10. A terminal for receiving video contents from a server according to claim 9, the terminal comprising a receiver integrating a buffer enabled to decode firstly the multiplexed scalable codec base layer of the video content requested by the user of the terminal and then to decode the multiplexed enhancement layers for the video content.

* * * * *